(12) United States Patent
Boltersdorf et al.

(10) Patent No.: US 12,521,693 B2
(45) Date of Patent: Jan. 13, 2026

(54) SORBENT MATERIAL FOR REMOVING CONTAMINANTS FROM WATER

(71) Applicant: Puraffinity Ltd, London (GB)

(72) Inventors: Tamara Boltersdorf, London (GB); Liberty Jocasta Rockey, London (GB)

(73) Assignee: Puraffinity Ltd, London (GB)

( * ) Notice: Subject to any disclaimer, the term of this patent is extended or adjusted under 35 U.S.C. 154(b) by 496 days.

(21) Appl. No.: 17/919,461

(22) PCT Filed: Apr. 19, 2021

(86) PCT No.: PCT/GB2021/050936
§ 371 (c)(1),
(2) Date: Oct. 17, 2022

(87) PCT Pub. No.: WO2021/209774
PCT Pub. Date: Oct. 21, 2021

(65) Prior Publication Data
US 2023/0149894 A1    May 18, 2023

(30) Foreign Application Priority Data

Apr. 17, 2020  (GB) ...................................... 2005614
Sep. 11, 2020  (GB) ...................................... 2014349

(51) Int. Cl.
| | |
|---|---|
| *B01J 20/24* | (2006.01) |
| *B01D 71/10* | (2006.01) |
| *B01D 71/60* | (2006.01) |
| *B01J 20/28* | (2006.01) |
| *B01J 20/30* | (2006.01) |
| *C02F 1/28* | (2023.01) |

(Continued)

(52) U.S. Cl.
CPC .............. *B01J 20/24* (2013.01); *B01D 71/10* (2013.01); *B01D 71/60* (2013.01);
(Continued)

(58) Field of Classification Search
CPC .......... B01D 71/10; B01D 71/60; B01J 20/24; B01J 20/28004; B01J 20/28038;
(Continued)

(56) References Cited

U.S. PATENT DOCUMENTS

2015/0344520 A1  12/2015  Matsumoto et al.
2022/0055015 A1   2/2022  Kupracz et al.

FOREIGN PATENT DOCUMENTS

| CN | 105289528 A | 2/2016 |
|---|---|---|
| CN | 107224965 B | 8/2019 |

(Continued)

OTHER PUBLICATIONS

PAC, 1995, 67, 1307. (Glossary of class names of organic compounds and reactivity intermediates based on structure (IUPAC Recommendations 1995)) [Office action cites "alkyl group" on p. 1314]. (Year: 1995).*

(Continued)

*Primary Examiner* — Brian A Mccaig
(74) *Attorney, Agent, or Firm* — Nixon Peabody LLP; David S. Resnick; Nicole D. Kling

(57) ABSTRACT

Provided is a composition for removal of a target substance from a fluid stream, the composition comprising a support material comprising cellulose; and a sorbent molecule that comprises a linear or branched polyamine having a molecular weight of less than 500. The polyamine is covalently linked to the support material, and the sorbent molecule further comprises a covalently linked hydrophobic group. Also provided are processes for removal of a target substance from a fluid stream comprising contacting the fluid stream with such composition, and methods of making such compositions.

23 Claims, 7 Drawing Sheets

(51) Int. Cl.
*C02F 1/44* (2023.01)
*C08B 15/06* (2006.01)
*C02F 101/36* (2006.01)

(52) U.S. Cl.
CPC ..... *B01J 20/28038* (2013.01); *B01J 20/3085* (2013.01); *C02F 1/288* (2013.01); *C02F 1/44* (2013.01); *C08B 15/06* (2013.01); *C02F 1/285* (2013.01); *C02F 1/286* (2013.01); *C02F 2101/36* (2013.01); *C02F 2303/16* (2013.01)

(58) Field of Classification Search
CPC ................. B01J 20/3085; B01J 20/3212; B01J 20/3217; B01J 20/3251; B01J 20/3278; B01J 20/328; B01J 20/3425; B01J 20/3475; C02F 1/285; C02F 1/286; C02F 1/288; C02F 1/44; C02F 2101/36; C02F 2303/16
See application file for complete search history.

(56) References Cited

FOREIGN PATENT DOCUMENTS

| | | |
|---|---|---|
| JP | 2012101159 A | 5/2012 |
| JP | 2013078724 A | 5/2013 |
| JP | 2014231056 A | 12/2014 |
| JP | 2016006410 A | 1/2016 |
| WO | 2017178100 A1 | 10/2017 |
| WO | 2017/203281 A1 | 11/2017 |
| WO | 2019/186166 A1 | 10/2019 |

OTHER PUBLICATIONS

Fox et al., "Staudinger Reduction Chemistry of Cellulose: Synthesis of Selectively O-Acylated 6-Amino-6-deoxy-cellulose." Biomacromolecules 13(4) 992-1001 (2012).

* cited by examiner

Figure 1B — compound 3 - TREN
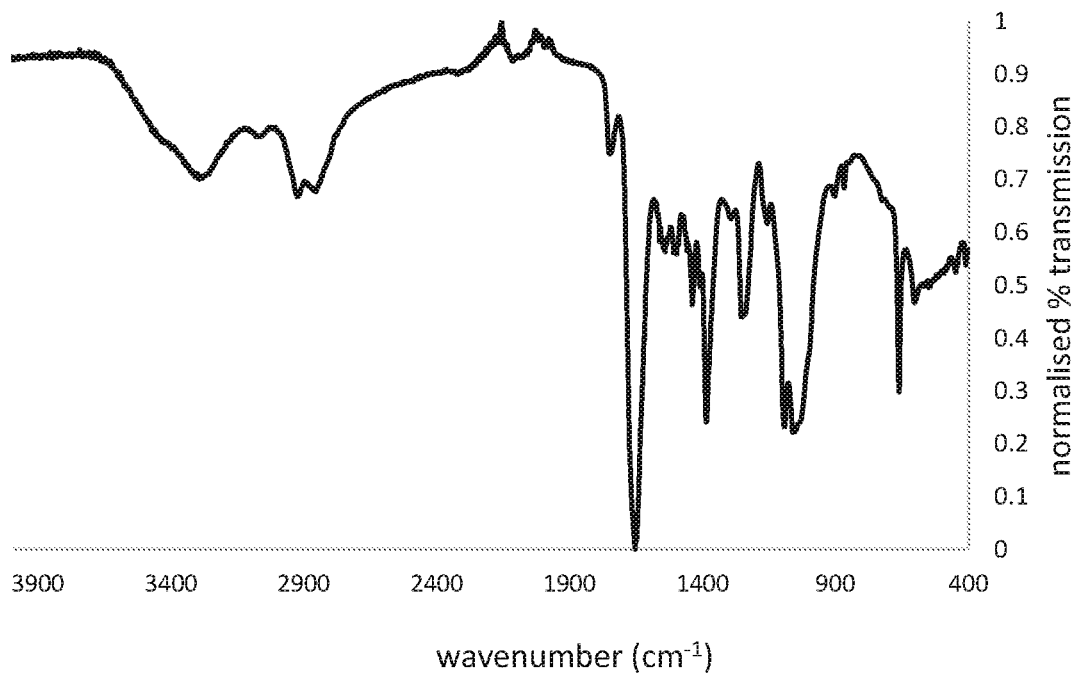
Figure 1C — compound 4 – TREN octa
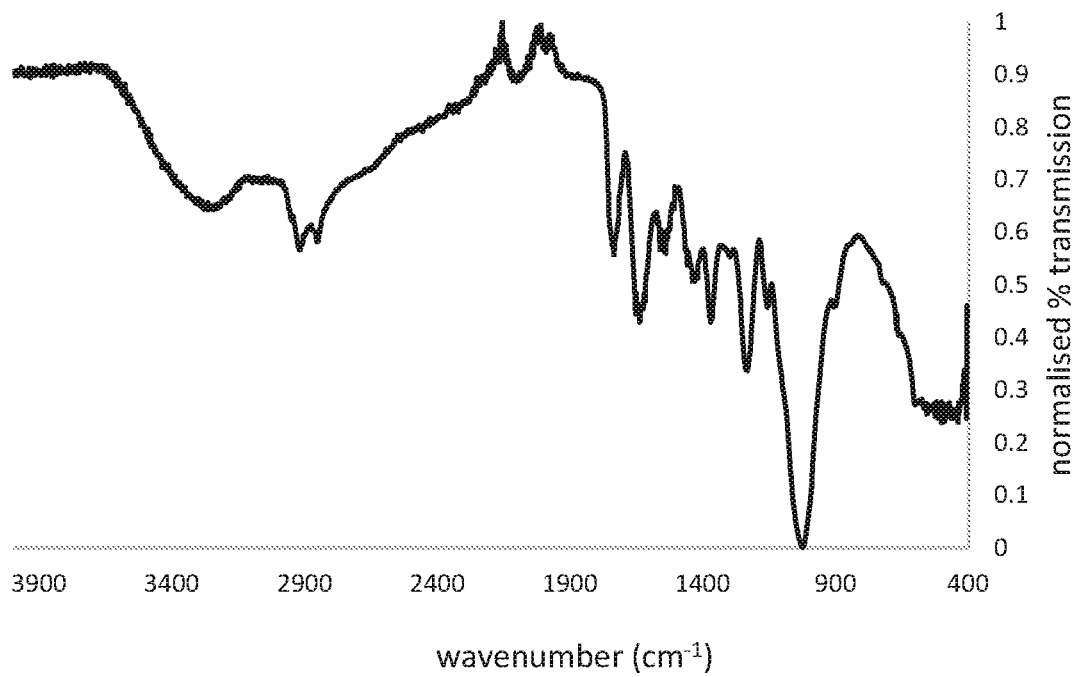

SORBENT MATERIAL FOR REMOVING CONTAMINANTS FROM WATER

CROSS-REFERENCE TO RELATED APPLICATIONS

This application is a 35 U.S.C. § 371 National Phase Entry Application of International Application No. PCT/GB2021/050936 filed Apr. 19, 2021, which designates the U.S. and claims benefit under 35 U.S.C. § 119 (b) of G.B. Application No. 2014349.1 filed Sep. 11, 2020, and of G.B. Application No. 2005614.9 filed Apr. 17, 2020, the contents of which are incorporated herein by reference in their entireties.

FIELD OF THE INVENTION

The invention is concerned with the removal of target substances from fluids, such as liquids, using chemically modified filtration materials based on polyamines, as well as methods to produce such materials. The present invention further relates to materials for water treatment, sorbent media, amine surface functionalisation, cellulose chemical modification, anion binding, hydrophobic interactions, perfluoroalkyl and polyfluoroalkyl substances (PFAS), water contaminants and filters.

BACKGROUND OF THE INVENTION

There exists an on-going need for the remediation and recycling of contaminated supplies of key fluid solvents, such as water. It is necessary to re-use and replenish existing resources rather than simply dispose of them. Global environmental protection regulations also require water supplies threatened with contamination from industrial activity to meet increasingly stringent purity standards.

Important fluids used in industrial and agricultural processes include not only water, but also solvents, fuels, lubricants and working fluids. All of these fluids can be exposed to chemical contamination through normal use in industrial processes, or via exposure to waste products, whether intentionally or accidentally. By way of example, in industrialised countries typically up to two thirds of all water consumption can be attributed to the needs of industry.

Water quality is typically determined by comparing the physical and chemical characteristics of a water sample with internationally agreed water quality standards. For example, current drinking water quality guidelines and standards are designed to enable the provision of clean and safe water for human consumption, thereby protecting human health. These standards are suitably based on scientifically assessed acceptable levels of toxicity to either humans or aquatic organisms. However, declining water quality has become an issue of global concern as human populations approach 8 billion, corresponding industrial and agricultural activities expand, and climate change threatens major alterations to historical hydrological cycles. It is essential, more than ever, that better ways of getting more out of each unit of water consumed are developed to support sustainable future growth.

There are diverse sources of environmentally damaging pollutants, including wastewater from industrial plants and chemical process facilities which has been improperly disposed of; surface runoff containing fertilisers and pesticides used on agricultural areas; and cleaning detergents as well as flame retardants used in fire-fighting foams. Many industrial chemical contaminants can persist in nature for decades before degrading, and can cause great harm to plants, animals and humans, even at very low concentrations. The impact on ecological systems is also profound, with persistent pollutants often concentrating in the bodies of organisms higher up the food chain.

One particular class of persistent environmental pollutants includes halogenated organic compounds such as poly- and perfluorinated alkyl substances (PFAS). PFAS are organofluorine compounds that are considered to be chemically inert. They are persistent in the environment and their use is controlled in many countries by the United Nations Framework Convention on Climate, the "Kyoto Protocol" and REACH. Perfluorooctane sulfonic acid (PFOS) and its derivatives have been included in the Stockholm Convention and are restricted within the EU under the Persistent Organic Pollutant (POP) regulation. PFOS and perfluorooctanoic acid (PFOA) are toxic PFAS compounds that are used extensively as surfactants and in flame retardants for fire-fighting foams and metal plating processes. Both PFOS and PFOA persist in the environment for very long periods of time and are recognised contaminants in most of the world's fresh water supplies.

Adsorption of PFAS compounds such as PFOS and PFOA, onto granular activated carbon represents a current recommended solution for their removal from contaminated water. However, the process is slow and inefficient. In particular, the charged and shorter chain, PFAS pollutants quickly "break-through" beds of activated carbon, meaning large quantities of activated carbon are required, which must be frequently replaced once saturated with PFAS. Currently, adsorbed PFAS cannot efficiently be washed off activated carbon for regeneration "in situ". In addition, a significant proportion of activated carbon manufactured globally is derived from fossil fuels, such as bituminous coal, which is activated via physical processes that release substantial amounts of carbon dioxide. Hence, activated carbon represents an expensive, non-sustainable and single use solution to the problem of removing PFAS from contaminated water. Ion exchange approaches are also commonly used, but such methods have a large footprint, and reliability is again an issue due to breakthrough. Operational longevity and cost-effectiveness are also issues.

Previous efforts to remove PFAS contaminants from water include, for example, the use of cellulosic materials functionalised with high molecular weight polyamines such as polyethylenimine (PEI, typically 25 kDa), combined with hydrophobic groups (see WO2017/203281).

There exists a need to provide economical and re-usable compositions and processes that enable the removal of low concentrations (<1 ppm) of target substances, in particular polluting contaminants, such as PFAS, from fluid streams, such as wastewater or within the wider environment. The present invention seeks to overcome the present challenges, including reducing the impact of industrial activity on the aquatic environment, and to meet these objectives.

SUMMARY OF THE INVENTION

The present invention provides further surprising development of present technology, in particular regarding the novel functionalisation of solid substrates to optimise and fine tune them towards improved target compound removal from fluid streams. In specific embodiments, the performance difference is particularly notable in the adsorption of short chain PFAS, indicating the presently demonstrated surface functionalisation may be widely applicable for remediation of short-chain PFAS contamination in fluids such as water.

A first aspect of the invention provides a composition for removal of a target substance from a fluid stream, the composition comprising:
  a support material comprising cellulose; and
  a sorbent molecule that comprises a linear or branched polyamine having a molecular weight of less than 500;
  wherein the polyamine is covalently linked to the support material; and
  wherein the sorbent molecule further comprises at least one covalently linked hydrophobic group.

The support material may typically be a porous, solid and/or particulate support material. Suitably the support material comprises cellulose, and is comprised of a material selected from one or more of the group consisting of: regenerated cellulose; lignocellulose; bacterial cellulose; cellulose pulp; microcrystalline or nanocrystalline cellulose; cellulose fibres; fibrillated cellulose and other cellulose derivatives. Optionally, the support material can be a powder or pulp, such as a cellulose or lignocellulose powder or pulp. If in particulate form, the support material can comprise for example one or more of the group consisting of a plurality of: granules; flakes; beads; pellets; and pastilles. The support material may comprise acetylated cellulose.

In embodiments where the support material is porous, solid, and particulate, the support material is suitably comprised of particles with an average size diameter greater than about 0.01 mm, and less than about 1 mm.

In an embodiment of the invention, the polyamine is selected from an alkyl polyamine having a molecular weight of less than 300, optionally less than 200.

In a specific embodiment of the invention the polyamine is selected from a compound of Formula I,

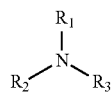

I where $R_1$ and $R_2$ are selected from H, —$CH_3$ or a linear or branched $C_2$-$C_6$ alkyl mono- or di-amine, and;
where $R_3$ is selected from:
  a linear or branched $C_2$-$C_6$ alkyl mono- or di-amine;
  a linear dialkylamine of formula II:

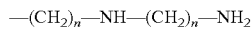

II where n may be any integer of between 2 and 6;
a linear alkylamine of formula III

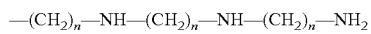

III where n may be any integer of between 2 and 6; and
a branched trialkylamine of formula IV:

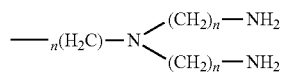

IV where n may be any integer of between 2 and 6.

In specific embodiments of the invention, the polyamine is selected from one or more of the following compounds:

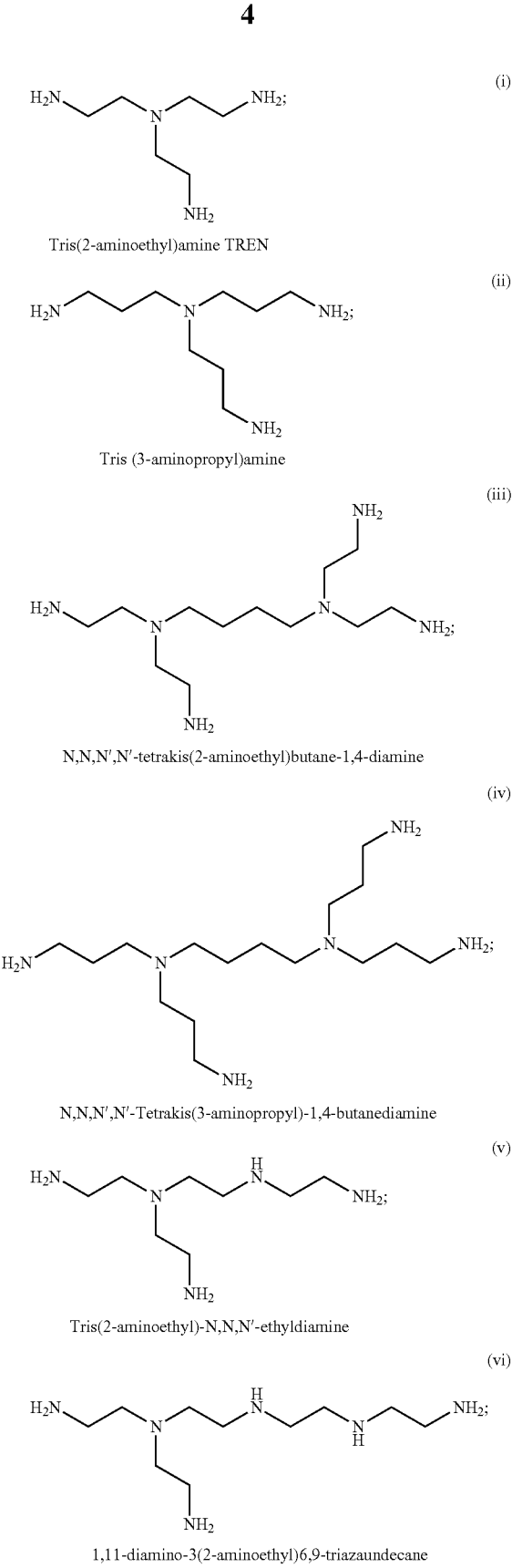

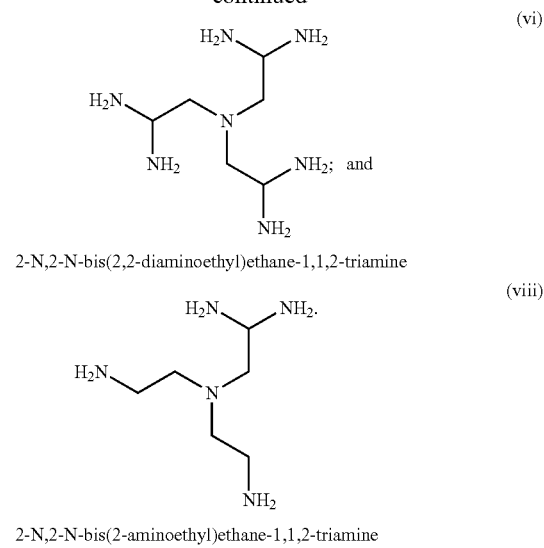

2-N,2-N-bis(2,2-diaminoethyl)ethane-1,1,2-triamine (vi)

(viii)

2-N,2-N-bis(2-aminoethyl)ethane-1,1,2-triamine

In a further embodiment of the invention the polyamine is selected from one or more of the following compounds:

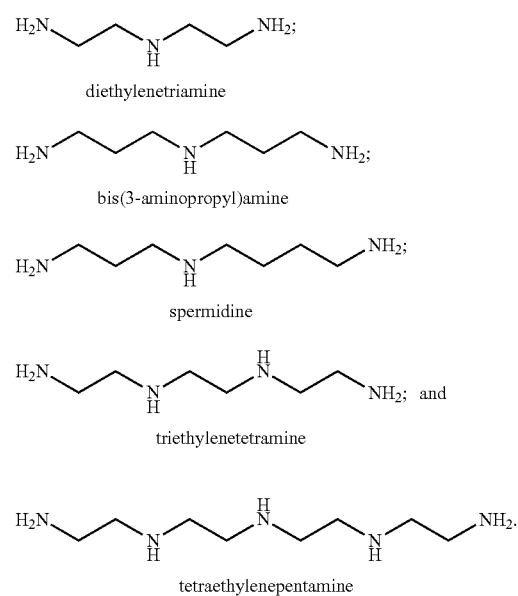

(a) diethylenetriamine (b) bis(3-aminopropyl)amine (c) spermidine (d) triethylenetetramine; and (e) tetraethylenepentamine In specific embodiments the polyamine provides a core (i.e. a polyamine core), wherein the polyamine core is covalently linked to at least one hydrophobic group.

Suitably, the hydrophobic group comprises a group selected from: a $C_2$-$C_{22}$ branched, linear or cyclic, saturated or unsaturated alkyl; or an aryl. Typically, this group is selected from a $C_2$-$C_{22}$ branched, linear or cyclic alkyl; or an aryl. Optionally the $C_2$-$C_{22}$ branched or linear alkyl group is selected from a butyl, hexyl or octyl group. Suitably, the $C_2$-$C_{22}$ linear alkyl group is a $C_4$-$C_8$ branched or linear alkyl selected from an isobutyl, isohexyl or isooctyl group. In a specific embodiment of the invention the $C_2$-$C_{22}$ alkyl group is a cycloalkyl selected from a cyclohexyl, cycloheptyl or cyclooctyl group. In a further embodiment, the aryl group is selected from the group consisting of: a phenol, benzene or benzyl. In a further embodiment the hydrophobic group is a $C_2$-$C_{22}$ poly or perfluorinated group, suitably a $C_8$ perfluorooctane or $C_8$ polyfluorinated, 6:2 fluorotelomer. Optionally the sorbent molecule comprises a plurality of hydrophobic groups.

According to specific embodiments of the present invention, the polyamine core group is linked to the hydrophobic group via an amide bond. The polyamine and hydrophobic group may alternatively be linked via a urea linkage, a thiourea linkage; an isothiouronium linkage, a guanidinium linkage or directly via an alkylation reaction, or a quaternisation (Menshutkin) reaction.

A second aspect of the invention provides for a process for removal of a target substance from a fluid stream comprising contacting the fluid stream with a composition comprising a composition as described herein. The target substance may comprise one or more poly- and perfluorinated alkyl substance (PFAS).

Typically the fluid is a liquid, optionally the liquid is selected from: water; an organic solvent; a liquid fossil fuel; a liquid lubricant; and a working fluid. In embodiments of the invention the liquid is contaminated water.

In a specific embodiment of the invention, the target substance is a contaminant. The contaminant may comprise one or more poly- and perfluorinated alkyl substance (PFAS), optionally selected from a perfluorinated anionic surfactant compound, including one or more selected from the group consisting of: perfluorobutane sulfonate (PFBS); perfluorobutanoic acid (PFBA); perfluoropentanoic acid (PFPeA); perfluorohexanesulfonate (PFHS); perfluorohexanoic acid (PFHA); perfluorooctanoic acid (PFOA); perfluorooctane sulfonate (PFOS); perfluorononanoic acid (PFNA); and perfluorodecanoic acid (PFDA); 6:2 fluorotelomer sulfonic acid (6:2 FTSA); and hexafluoropropylene oxide dimer acid (HFPO-DA). Alternatively, the contaminant may comprise an organic compound, optionally a pharmaceutical or pesticide molecule.

In a specific embodiment the support material is deployed within a filter, which may also be comprised of a bed or a packed column, and the fluid stream is passed through or across the filter, bed or packed column.

According to a further embodiment of the invention the process further comprises regenerating the composition after removal of the target substance from the fluid stream. Suitably, the step of regenerating the composition comprises applying an aqueous wash to the sorbent material or a series of washes. Optionally, regeneration of the support material comprises applying a salt wash, or acidic wash or basic wash to the composition. The wash may comprise a liquid having a pH greater than 9, or alternatively a pH of less than 5. In some embodiments, regeneration of the support material comprises a liquid wash that comprises one or more of the group consisting of: an aqueous salt solution; a basic wash, optionally wherein the base is selected from ammonium hydroxide, sodium hydroxide and potassium hydroxide; and a polar organic solvent, optionally selected from an alcohol or a ketone.

A third aspect of the invention provides a method for manufacturing a composition for removal of a contaminant substance from a fluid stream, the method comprising:
  a. providing a support material; and
  b. linking the support material to a contaminant-sorbent molecule comprising a linear or branched polyamine having a molecular weight of less than 500.

A fourth aspect of the invention provides the use of a molecule that comprises a linear or branched polyamine having a molecular weight of less than 500 and at least one covalently linked hydrophobic group as a sorbent group in a method for functionalising a cellulose support material.

A fifth aspect of the invention provides for a filter for the adsorption of a target substance from a contaminated water source, wherein the filter comprises a composition as described herein.

Within the scope of this disclosure it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

FIGS. 1B, 1C, 1D, and 1E respectively show the normalised FT-IR spectra of compounds 3, 4, 5 and 6 of FIG. 1A in separated view.

DETAILED DESCRIPTION OF THE INVENTION

Figure 1A:
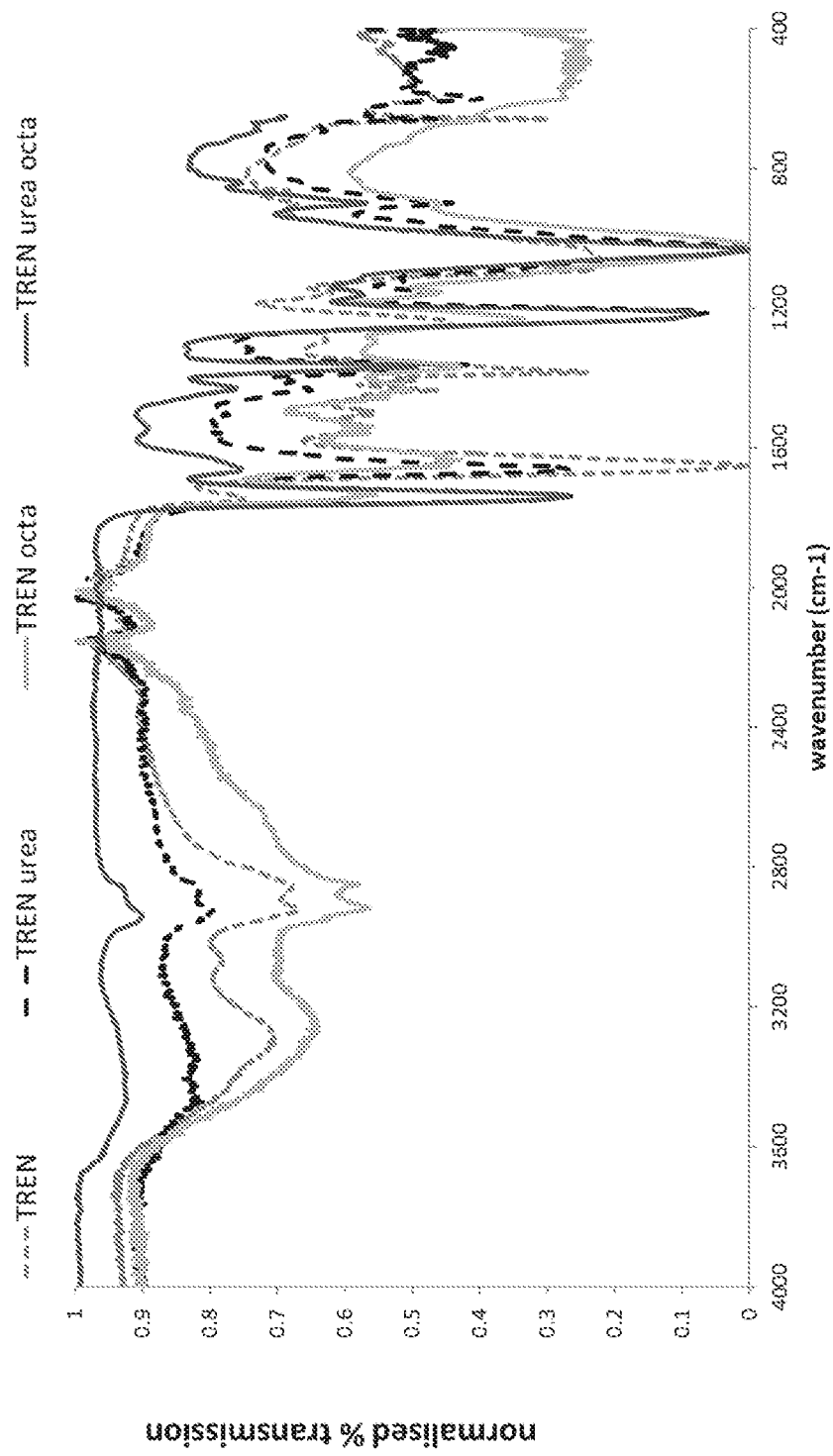
FIG. 1A shows normalised FT-IR spectra of compounds 3, 4, 5 and 6 of embodiments of the invention labelled TREN, TREN octa, TREN urea and TREN urea octa respectively.
Figure 1D:
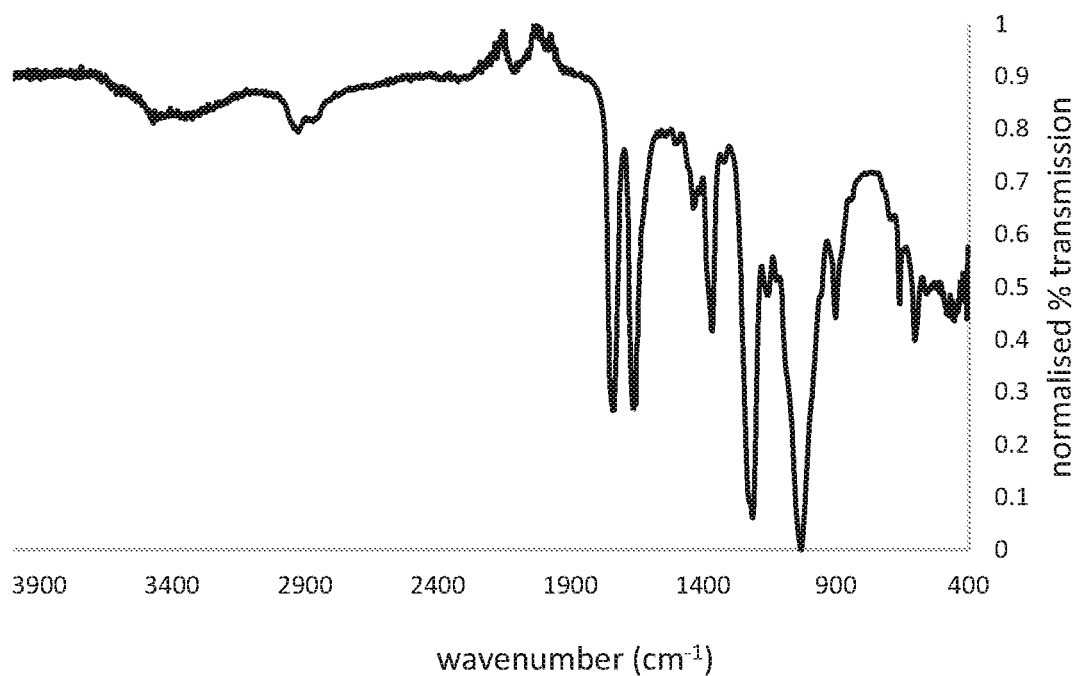
Figure 1E:
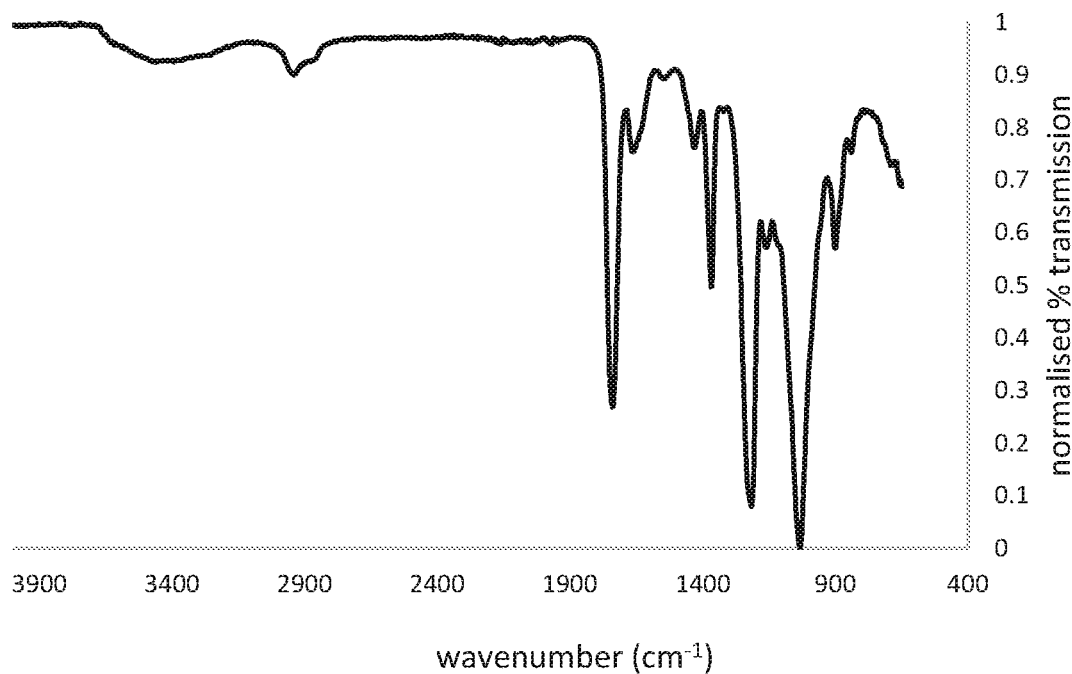

Unless otherwise indicated, the practice of the present invention employs conventional techniques of chemistry, materials science and process engineering, which are within the capabilities of a person of ordinary skill in the art.

Prior to setting forth the invention, a number of definitions are provided that will assist in the understanding of the invention. All references cited herein are incorporated by reference in their entirety. Unless otherwise defined, all technical and scientific terms used herein have the same meaning as commonly understood by one of ordinary skill in the art to which this invention belongs.

As used herein, the term 'comprising' means any of the recited elements are necessarily included and other elements may optionally be included as well. 'Consisting essentially of' means any recited elements are necessarily included, elements that would materially affect the basic and novel characteristics of the listed elements are excluded, and other elements may optionally be included. 'Consisting of' means that all elements other than those listed are excluded. Embodiments defined by each of these terms are within the scope of this invention.

The term 'target' or 'target substance' refers herein to a substance or compound which it is desired to remove or isolate from a fluid. Target substances can be dissolved (i.e. a solute), suspended, emulsified, dispersed, or otherwise carried in the fluid, and as such may be soluble, partially soluble or insoluble in the fluid. As discussed below, target substances can comprise contaminant substances and/or valuable substances which it is desired to remove, and in some cases recover, from the target fluid.

Target substances as contemplated herein can include 'contaminants' or 'contaminant substances'. In the context of the present invention, 'contaminants' are intended to encompass substances which may be harmful to the health of humans or animals, or to the environment. Consequently, derivative terms are defined accordingly, for example, a contaminated fluid is a fluid comprising a contaminant substance. Typically, the contaminant comprises one or more per- and polyfluoroalkyl substances (PFAS), typically one or more perfluorocarbons, optionally selected from a perfluorinated anionic surfactant compound, including one or more selected from the group consisting of: perfluorooctanoic acid (PFOA); perfluorobutane sulfonate (PFBS); perfluorohexanesulfonate (PFHS); perfluorohexanoic acid (PFHA); perfluorooctane sulfonate (PFOS); perfluorononanoic acid (PFNA); perfluorodecanoic acid (PFDA); 6:2 fluorotelomer sulfonic acid (6:2 FTSA); and hexafluoropropylene oxide dimer acid (HFPO-DA, also known as GEN-X, with chemical name 2,3,3,3-tetrafluoro-2-(heptafluoropropoxy) propanoic acid). In some embodiments, the contaminant comprises an organic compound, optionally a pharmaceutical or pesticide molecule including one or more selected from the group consisting of: diclofenac, erythromycin, estrogens, oxadiazon and thiamethoxam. The contaminant may in some embodiments be a metal or metalloid ion, optionally selected from copper, iron, lead, mercury, chromate or arsenate.

The target substance may be a valuable substance. A substance may be valuable if it contains rare elements or molecules, is a complex molecule which is difficult to manufacture, or is in any other way economically valuable enough to want to recover from a fluid. Valuable substances may be present in a fluid as a result of manufacturing, refining, mining, purification, or recovery processes. In some cases, valuable substances may also in their own right be contaminants, for example if they are harmful to the health of humans or animals, or to the environment. Valuable substances may suitably be precious metals, rare earth metals, base metals, or platinum group metals, or salts thereof. Precious metals may include gold and silver. Platinum group metals may particularly include platinum and palladium. Valuable substances may in some embodiments be small molecules, such as drugs or fine chemicals.

The term 'fluid stream' or 'fluid' refers to a flowable substance in which the target substance is dissolved, suspended, emulsified, dispersed, or otherwise carried. The fluid can be for example a liquid, or a gas. Suitably the fluid is a liquid, optionally the liquid is selected from: water; an organic solvent; a liquid fossil fuel; a liquid lubricant; an ionic liquid; a working fluid; and mixtures thereof.

The term 'cellulose' refers to a biological polymer which is a linear polysaccharide composed of glucose monomers linked with β(1→4) glycosidic bonds. Cellulose may also refer to material which further comprises hemicellulose, a polysaccharide composed of glucose and other monosaccharides, which is branched and has shorter chains than are found in cellulose. Cellulose may be formed of crystalline and amorphous regions. Amorphous fibrils of cellulose may be hydrolysed into nanocrystalline form, also referred to as nanocellulose.

Lignocellulose, or lignocellulosic biomass, refers to a biological material comprising cellulose and lignin, which may also comprise hemicellulose and pectin. Lignocellulose comprises much of the biomass of plants and as such is known for its high availability and resistance to degradation. This resistance is a consequence of the lignin molecules creating crosslinks between cellulose and hemicellulose chains through ester and ether linkages, Lignocellulose may be obtained from a number of sources, which include any terrestrial plant matter harvested for the purpose, or industry-related feedstocks or waste biomass produced from sources such as agriculture, forestry, construction, pulp and paper production and biofuel production. Typically, lignocellulose is obtained from agricultural wastes such as pips, husks, shells and stover (discarded leaves and stalks after the harvesting of grain). In particular, the lignocellulose can be derived from nut shells or the pips, stones, seeds or pits of fruits. The lignocellulose is dried, then crushed and sieved to the predetermined particle size. Natural cellulose may also be solubilised and regenerated to form fibres or films, so-called regenerated cellulose. Examples of regenerated cellulose products that may be utilised as a substrate for the generation of sorbent materials as described herein include, by way of example, Rayon®, Lyocell®/Tencel®, viscose fibre, and Forticell®.

The terms 'bacterial cellulose', 'microbial cellulose', 'bacterially produced cellulose' and 'bacterially produced nanocellulose' as used herein are equivalent and refer to cellulose produced by bacteria or microorganisms, such as species from the genera of Gluconacetobacter, and others, that is characterised by high tensile strength, high tensile stiffness, high chemical purity, biocompatibility and high water-to-cellulose ratio. Suitably such bacterial cellulose will be substantially free of associated molecules typically present in plant-derived cellulose such as lignin.

Microfibrillated cellulose' refers to cellulose processed by mechanical treatment with or without enzymatic or chemical pre-treatment. The material consists of long thin fibres, micrometers in length. 'Microcrystalline cellulose' refers to a pure partially depolymerized cellulose produced by breaking down amorphorous regions of the cellulose via physical, chemical or enzymatic means to leave crystalline domains.

The term 'modified' as used herein in the terms 'modified cellulose' or 'modified lignocellulose' refers to cellulose or lignocellulose which has been modified by the addition of chemical compounds. These compounds may be linked to the cellulose or lignocellulose by covalent bonds, ionic bonds, electrostatic bonds or affinity interactions. Modification may include where a chemical compound linked to the cellulose or lignocellulose is subsequently itself modified by reaction with another compound, and so forth. In particular, it is envisaged that cellulose may be modified by the addition of target substance sorbent molecules. Other possibilities for modification include the addition of polyamine groups, typically polyethylenimine. The polyamine groups may be linear or branched and are suitably branched polyethylenimine. The polyamine groups may themselves be further modified by the addition of further chemical groups, such as hydrocarbon groups.

The term 'silica' refers to materials comprising of silicon dioxide, with the formula $SiO_2$. These may or may not be hydrated and may in a granular, porous form referred to as 'silica gel'. Alternatively, the silica-based material may be a silicate mineral such as sodium silicate.

The term 'sorbent material' as defined herein refers to a material comprising a support or substrate material, which further comprises a sorbent functional group. The sorbent material is suitable for contacting a fluid stream that comprises a target substance, such as a contaminant, which may be a PFAS, such that the target substance is adsorbed onto, absorbed into, or otherwise taken up by the sorbent material. Suitably the sorbent material is deployed within a filter/purifier and/or a bed or a packed column (e.g. including a plurality of stacked filters) and the fluid stream is passed through or across the filter, bed or packed-column. The sorbent material may be deployed within a mixed bed combined with another adsorbent material such as granular activated carbon or an ion-exchange resin. In one embodiment the sorbent material is comprised within a prepared component such as a filter cartridge, so that used sorbent material can be conveniently contained, and similarly replaced or replenished with fresh or regenerated sorbent material as necessary. Alternatively, the sorbent material may be added to the fluid as a dispersion. The sorbent material may be particulate, that is to say in the form of granules; flakes; beads; pellets; or pastilles. The sorbent material may be a powder or a pulp, in particular a cellulose, microfibrillated cellulose, microcrystalline or nanocrystalline cellulose, or lignocellulose powder or pulp which can advantageously provide higher accessible surface area. The sorbent material may be incorporated into a membrane, or membrane-like filter. Membranes can also be functionalised as described herein directly. In particular, a pulp can be used to make membranes or membrane-like products, which can be used to make filters. An advantage of filters of this kind is that they can be made with specific thickness, and with a large surface area, while also ensuring that fluid passes through when appropriately installed in a fluid flow path. Further, filters can combine the functionality of the invention with particulate (size exclusion) removal capabilities. Typically, the sorbent material is particulate or granular in form, suitably the average diameter size of the particles or granules (as measured by the largest diameter of the particles) is greater than about 0.01 mm, suitably greater than about 0.1 mm, and typically less than about 1 mm, and optionally less than about 500 μm.

The term 'sorption', 'sorb', 'sorbent' and derivatives as used herein refer to the removal of target substances such as contaminants from the fluid stream by the association of said target substances with the modified support material described. Sorption by the material may happen by any means, for example by adsorption to the surface of the material, which may be by the creation of chemical interactions between the target substance and the support material, including electrostatic attraction, hydrophobic interactions, the formation of covalent bonds, ligation, chelation, van der Waals forces, hydrogen bonds, or otherwise. 'Sorption' also refers to absorption of the target substance into the material. The target substance may become physically trapped inside intermolecular space, pores or other voids within the material. In particular, sorption may be adsorption occurring by the formation of chemical interactions between the target substance molecule and the sorbent molecule with which the sorbent material has been modified. Such chemical interactions lead to the sequestration of the target substance within the sorbent material and out of the fluid stream. Use herein of the term 'adsorption' or derivatives thereof is not intended to be bound by any theoretical limitation, but rather is intended to include sorption by other means, as defined above, except where otherwise specified.

In one embodiment of the present invention there is provided a composition for removal of target substances and/or contaminants from a fluid stream. The composition comprises a sorbent material comprising a support material covalently linked to a target substance sorbent molecule. The support materials have high surface area to volume ratio and therefore provide an efficient support for molecules which are able to act as sorbents for target substances. The granular sorbent particles are designed to be deployed as a sorbent media for wastewater treatment in a standard packed bed. The granules have some porosity but are hard, durable and resistant to degradation.

Where the sorbent material comprises cellulose, the particles may be produced from agricultural waste such as stover, pips, bagasse, coir and shells, and processed into granular particles by crushing and sieving. After chemical modification with target substance sorbent molecules as discussed below, the sorbent granules can be deployed in a standard packed filtration bed or column, as with other media deployed in this way (granular activated carbon or ion-exchange resins). They may be positioned such that they are contacted by a fluid stream such as wastewater comprising target substances. The fluid stream may flow over or through the granules by positive or negative pressure, such as implemented by a gravity feed, or pumping, vacuuming or otherwise impelling the fluid stream by any suitable means. Sorption occurs of the target substances by the granular sorbent material and the target substances therefore remain in situ whilst the water flows through and has the target substance removed. The filtration bed or column may be occasionally backflushed, to clear build-up of occlusions, such as organic matter or lime scale, that reduce flow rate.

The support material may also be selected from one or more of the group consisting of: silica; silica gel; and a silica derivative.

According to an aspect of the invention, the sorbent molecule comprises a polyamine group that functions as the structural core of the sorbent molecule. Polyamines are compounds comprising more than two amino groups. Typically, the sorbent molecules comprise polyamines typically with a molecular weight of less than 500 Daltons (Da). In specific embodiments of the invention, the polyamine core is comprised of a molecule having a molecular weight of less than 450, less than 400, less than 350, less than 300, less than 250 and optionally less than 200 Da. These polymers may be linear or branched. Highly branched polyamine polymers, sometimes termed 'dendrimers', comprise a plurality of primary amino groups on each polymer molecule. The polyamines typically utilised in the sorbent molecules of the invention comprise at least one terminal amine.

Suitably, in embodiments of the invention the polyamine core is comprised of a low molecular weight polyamine, less than 500, that is selected from a compound of Formula I, below:

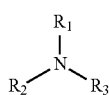

I where $R_1$ and $R_2$ are selected from H, —$CH_3$ or a linear or branched $C_2$-$C_6$ alkyl mono- or di-amine, and;

where $R_3$ is selected from:
a linear or branched $C_2$-$C_6$ alkyl mono- or di-amine;
a linear dialkylamine of formula II:

II where n may be the same or different and may be any integer of between 2 and 6;

a linear alkylamine of formula III

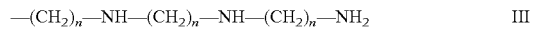

III where n may be the same or different and may be any integer of between 2 and 6; and a branched dialkylamine of formula IV:

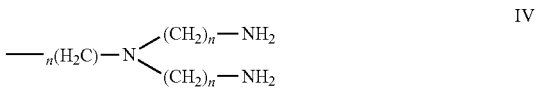

IV where n may be the same or different and may be any integer of between 2 and 6.

In a specific embodiment of the invention, $R_1$ and $R_2$ are not both H or both-$CH_3$ In embodiments of the invention, the sorbent molecule comprises a low molecular weight polyamine selected from one or more of the following suitable compounds:

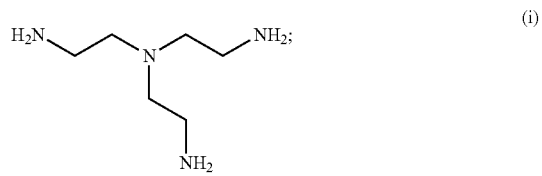

Tris(2-aminoethyl)amine TREN (i)

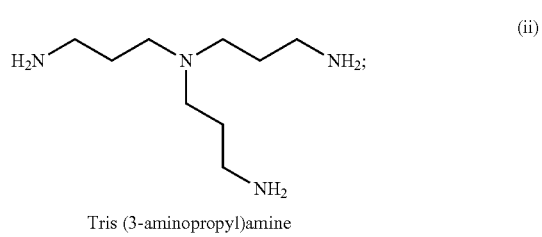

Tris (3-aminopropyl)amine (ii)

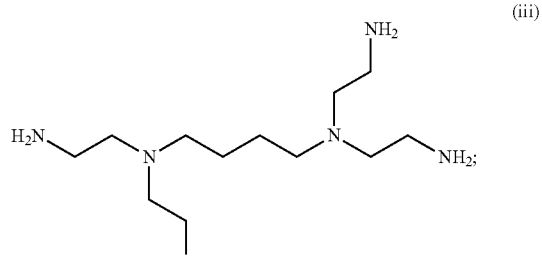

N,N,N',N'-tetrakis(2-aminoethyl)butane-1,4-diamine (iii)

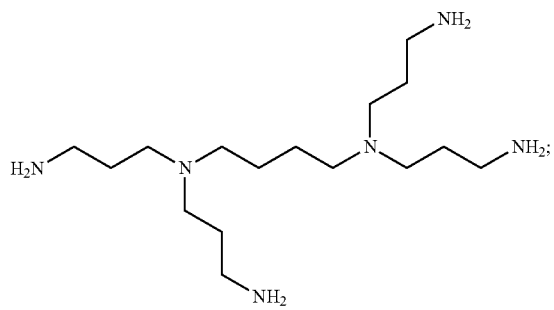

N,N,N',N'-Tetrakis(3-aminopropyl)-1,4-butanediamine

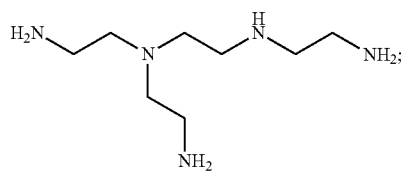

Tris(2-aminoethyl)-N,N,N'-ethyldiamine

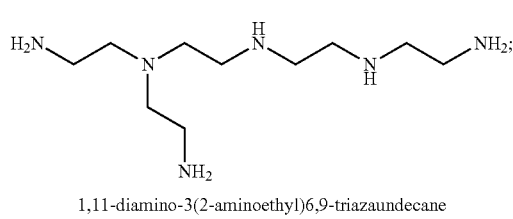

1,11-diamino-3(2-aminoethyl)6,9-triazaundecane

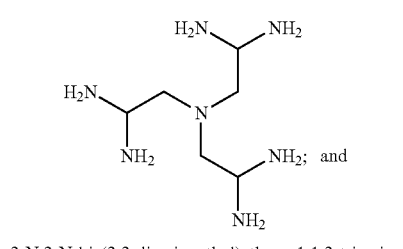

2-N,2-N-bis(2,2-diaminoethyl)ethane-1,1,2-triamine

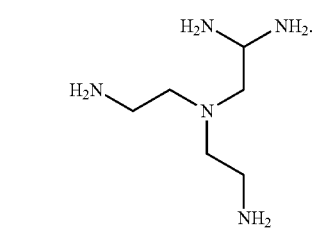

2-N,2-N-bis(2-aminoethyl)ethane-1,1,2-triamine

In alternative embodiments of the invention, the low molecular weight polyamine may be selected from a linear polyamine comprised of repeated subunits of diethylenetriamine and/or bis(3-aminopropyl)amine. Specific embodiments, may include:

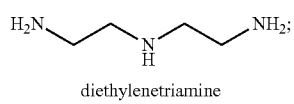

diethylenetriamine

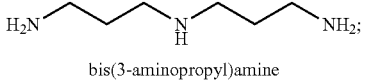

bis(3-aminopropyl)amine

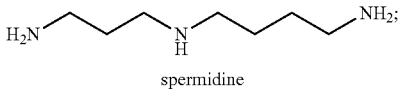

spermidine

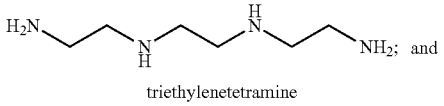

triethylenetetramine

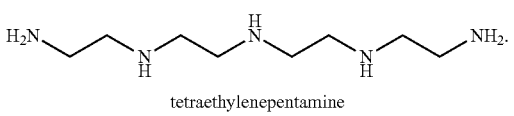

tetraethylenepentamine

In one embodiment of the invention the polyamine core comprises TREN.

In water treatment, very high molecular weight polyamines bound to solid support materials have been shown to be effective at removing heavy metals and dyes (see for example CN103041780B). However, the effectiveness of sorbent materials that comprises low molecular weight polyamines at removing anionic surfactants from water is surprising. In particular, sorbent fibres modified with low molecular weight polyamines according to an embodiment of the invention can remove PFAS from wastewater down to regulatory limits. In addition, unlike with activated carbon and resins, the sorbent material can then be regenerated with a solvent wash, to recover the pollutants and reuse the sorbent material.

Before the addition of target substance sorbent molecules, it may be necessary or desired to activate (or 'condition') the support substrate. This activation comprises the addition of a functional group to the cellulose or silica surface. In subsequent reactions, the target substance-sorbent molecule then forms a bond with the functional group added during activation, and so is linked to the support material. The covalent linkage may be via an ester, an ether, a carbamate, or a thiocarbamate linkage. In some embodiments, a cellulose support is activated by reaction with halogenated alkyl or acyl halides, such as an alkyl bromide, bromoacetyl bromide, or bromosuccinimide. Chemically related groups with different chain lengths (methyl, propyl, butyl, pentyl, and so on) are also considered for use in this activation. In other embodiments the cellulose is activated by reaction with carbonyldiimidazole, or a cross-linking agent such as glutaraldehyde or epichlorohydrin. These activating functional groups provide potential chemical attachment points for the target substance-binding molecules with which the cellulose is eventually modified. These attachment points can result in a short linker existing between the support and the target substance-binding molecules. This linker may be, for example, that left by acylation with the halogenated acyl halides mentioned above (—C(=O)—C—). Not all of these 'attachment points' will necessarily be used for the attachment of the sorbent molecules, but addition of functional groups as described here can also be useful to protect pre-existing functional groups on the support material, and/or to impart further characteristics, as described in more detail below.

Similarly, the support material can be modified by similar reactions, for example to protect cellulose-based alcohol groups, both to prevent side reactions such as crosslinking as well as to improve the solubility of the material for further modifications. In some embodiments, therefore, the support material is partially protected with, for example, an ester, an ether, a carbamate, or a thiocarbamate group. For example, the support material can be reacted with one or more compounds, such as acetic anhydride, trimethylsilyl chloride, triisopropylsilyl chloride, benzoyl chloride before linking to the sorbent molecule. Accordingly, the support material can comprise acylated or acetylated cellulose.

In another embodiment, a granular, porous, silica gel substrate is activated by reaction with (3-Chloropropyl) trichlorosilane. This provides the chemical attachment point for formation of a covalent bond to the selected low molecular weight polyamine in a subsequent step. In this embodiment, the silica surface is first hydrated then activated by reaction with (3-chloropropyl) trimethoxy silane. The product is dried, and then the polyamine is covalently bound to the activated substrate.

According to the invention, the sorbent molecule comprises a polyamine group, also referred to as a polyamine core, that is itself modified by the addition of a further chemical group that is suitably a short chain hydrophobic group. In one embodiment, this further chemical group is added by reaction of an alkyl or aryl carboxylic acid, or acid halide or anhydride with an amine group of the polyamine group to form an amide bond between the polyamine and the hydrophobic group. Optionally the reaction is between the hydrophobic group and a terminal primary amine group comprised within the polyamine molecule. Reaction may also occur with secondary amines comprised within the polyamine core. In embodiments of the invention, a plurality of hydrophobic groups are reacted with a plurality of amine groups within the polyamine molecule. In some embodiments, substantially all the terminal primary amine groups present within the polyamine molecules are reacted with a hydrophobic group.

In embodiments of the invention the short chain hydrophobic group is selected from: a C2-C22 branched, linear or cyclic, saturated or unsaturated alkyl; or an aryl. Typically, this group is selected from a C2-C22 branched, linear or cyclic alkyl; or an aryl. Optionally the C2-C22 branched or linear alkyl group is selected from a C2-C12 alkyl group, suitably a butyl, hexyl or octyl group. In particular embodiments, the C2-C22 linear alkyl group is a C4-C8 branched or linear alkyl selected from an isobutyl, isohexyl or isooctyl group. In a specific embodiment of the invention the C2-C22 alkyl group is a cycloalkyl selected from a cyclohexyl, cycloheptyl or cyclooctyl group. In a further embodiment, the aryl group is selected from the group consisting of: a phenol, benzene or benzyl. In a further embodiment the hydrophobic group is a C2-C22 poly or perfluorinated group, suitably a C$^8$ perfluorooctane or C8 polyfluorinated, 6:2 fluorotelomer. Optionally the sorbent molecule comprises a plurality of hydrophobic groups that may be the same or different.

The substituted, particulate solid support product (e.g. substituted cellulose, lignocellulose or silica) is further reacted with, for example, an acylating agent, suitably an acyl or aryl acid halide. In one embodiment of the invention, hexanoyl or octanoyl choride is used in the acyl substitution of primary amines within the core polyamine group bonded to the solid support. The hexanoyl or octanoyl chloride is dissolved in dimethylformamide (DMF) and the reaction is carried out at close to ambient temperature in the presence of a base and catalyst diisopropylethylamine (DIPEA). In this way the hydrophobic group is linked to the polyamine core via an amide bond.

It will be appreciated that in alternative embodiments of the invention the acylating agent may comprise a compound of the formula:

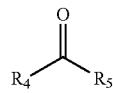

Wherein:
$R_4$ is a $C_2$-$C_{22}$ branched, linear or cyclic alkyl; or an aryl group
$R_5$ is a halide.

Typically $R_4$ is selected from a $C_2$-$C_{22}$, suitably a $C_2$-$C_{12}$, or optionally $C_4$-$C_8$, linear saturated or unsaturated alkyl group, most suitably selected from a butyl, hexyl or octyl group. Optionally $R_4$ is selected from an isopropyl, isobutyl or isohexyl group. $R_4$ may comprise a cycloalkyl selected from a cyclobutyl or cyclohexyl group. Where $R_4$ is an aryl, typically the aryl is selected from a phenol or benzyl group.

$R_3$ is typically selected from a chloride or a bromide.

The resultant sorbent molecule will possess unique properties of sorbency that may be tuned to the specific requirements of the sorbent material. Hence, it is an advantage of the present invention that the sorbent material may be readily optimised to target specific substances and/or contaminants within a fluid stream by modifying the chemistry of the sorbent molecule.

The primary targets for treatment in wastewater are poly or perfluorinated surfactants such as PFOA, PFOS, PFHA, PFHS, PFBA, PFBS, 6:2 FTSA and HFPO-DA.

It is also envisioned that treatment of wastewater to remove other target substances, contaminants or valuable substances (including precious or rare earth metals, for example present in wastewater from mining, purification or manufacturing processes), or treatment of other fluids such as organic solvents and oils or removal of impurities from liquid product streams, is possible. In addition, sorbent material according to the present invention could be used as a sorbent to remove target substances from gases.

Unlike other sorbents deployed in this way for organic pollutants, the sorbent material can be effectively regenerated in situ with a solvent wash step. The solvent wash can comprise an aqueous salt wash, an acid wash, a basic wash, or a combination, such as a salt and acid wash. The regeneration solution may further, or alternatively, comprise a non-aqueous polar solvent, such as acetone or an alcohol, such as ethanol, methanol or iso-propanol may be used. Suitably, where an aqueous wash is used the wash can comprise a liquid having a pH greater than 9, or alternatively a pH of less than 5. Optionally the wash solution comprises an aqueous ammonium hydroxide, ammonium chloride, ammonium sulphate potassium hydroxide, sodium bicarbonate or sodium hydroxide solution. In some embodiments, the wash liquid has a pH greater than 8, suitably greater than 9, or greater than 10. Where an acid wash is used it is suitably selected from an inorganic acid including hydrochloric acid, sulphuric acid, nitric acid, phosphoric acid or alternatively an organic acid suitably selected from acetic acid, hexanoic acid, ethanedioic acid or citric acid. The salt is suitably selected from a sodium, potassium or magnesium salt with a chloride, sulphate or phosphate counter ion. In some embodiments, the wash liquid has a pH less than 5, suitably less than 4, less than 3, or less than 2. The possibility of regeneration is particularly advantageous, in that it allows for the removal of target substances for recycling, recovery or safe disposal, as well as allowing the reuse of the sorbent material. In this way the proposed method for removing target substances is further reduced in cost, and in production of waste in the form of spent sorbent material.

The regeneration process suitably includes removing the sorbent material from the fluid stream and contacting it with a washing solvent as described. In an alternative embodiment, the regeneration process involves replacing the fluid stream with a solvent wash for a period of time to effect regeneration.

Without wishing to be bound by theory, the adsorption of target substances to compositions as described herein appears to be the result, primarily, of non-covalent interactions, such as electrostatic interactions, with the low molecular weight polyamine core combined with hydrophobic-hydrophobic interactions with the covalently linked hydrophobic group. In the regenerating solvent wash step, interactions with polar groups such as anions in the wash substitute for the electrostatic interactions with anionic target substances, releasing the target substances in the wash. Raising or lowering the pH changes the protonation state of the polyamine core, which may further reduce the electrostatic binding interactions with the adsorbed target compounds. The presence of other ions such as ammonium, can improve the solubility of adsorbed target compounds, further increasing their removal in the regenerating solvent wash step.

Another salient advantage of the present system is its low cost and ease of production. Production of granules or other forms of sorbent material such as a pulp, with a relatively low-cost low molecular weight polyamines and very low-cost support material (e.g. lignocellulose or silica) allows cost effective production of the material at large scale (~1000 kg per batch) allowing deployment in large volume wastewater applications (megalitres/day flow rate). In addition, the reactions involved with linking the sorbent substrate with the target substance-sorbent molecules may be carried out in large scale and, economically, often at relatively low temperatures (e.g. less than 100° C.) and at atmospheric pressures.

The invention is further illustrated by the following non-limiting examples:

EXAMPLES

Example 1—Production, Characterisation and Adsorption Performance General Materials Solvents and reagents were obtained from VWR or Sigma Aldrich and used without further purification. Cellulose Tencel fibres were obtained from Lenzing Fibres Grimsby.
Synthetic Methods The synthetic route towards sorbent materials compounds 3, 4, 5 and 6 is shown in Scheme 1 (see below).

Methods for bromination of cellulose were adapted from literature protocol [S. C. Fox and K. J. Edgar, *Biomacromolecules*, 2012, 13, 992-1001].

Cellulose fibres (10.00 g, 61.6 mmol of anhydroglucose units (AGUs)) were dissolved in dry dimethylacetamide (300 mL), heated under nitrogen to 160° C. for an hour and then cooled to 90° C. before adding LiBr (60.00 g). The reaction mixture was stirred for 2 further hours then allowed to cool to room temperature and kept under nitrogen overnight.

Triphenyl phosphine (48.38 g, 3 equivalents per AGU) was dissolved in dry dimethylacetamide (100 mL) and added to the reaction mixture at room temperature dropwise under nitrogen. Next, N-bromosuccinimide (32.93 g, 3 equivalents per AGU) was dissolved in dry dimethylacetamide (80 mL) and added to the reaction mixture over the course of half an hour. Once the reagents had been added, the reaction was heated at 70° C. for an hour, before dropwise addition of acetic anhydride (50 mL, 529 mmol). The reaction was heated overnight, cooled and then precipitated in a water/ethanol mixture (1:1 v/v, 6 L). The product was filtered in water and ethanol, and then twice redissolved in acetone and precipitated with ethanol, filtered and dried at 40° C. in a vacuum oven overnight.

Compound 2 (3.00 g, 9.7 mmol of AGUs) was added to a stirring solution of dimethylformamide (20 mL) and heated at 40° C. Tris(2-aminoethyl)amine (1.42 g, 9.7 mmol) was added to the solution. After 14 hours, the reaction was precipitated in water/ethanol (1:1 v/v, 100 mL), washed several times with water and dried at 40° C. in a vacuum oven overnight.

Compound 3 (2.50 g, 6.7 mmol of AGUs) and urea (0.40 g, 6.7 mmol) were dissolved in dimethylformamide (7 mL) and heated at 100° C. After 20 hours, the product was isolated by slow addition to a water/ethanol mixture (1:1 v/v, 100 mL), filtered and dried at 40° C. in a vacuum oven overnight.

Separately, compound 3 (1.00 g, 2.7 mmol of AGUs) was dissolved in dimethylformamide (7 mL) at 70° C. To the stirring reaction mixture, N,N-diisopropylethylamine (0.1 mL) and octanoyl chloride (0.46 mL, 5.4 mmol) were added. After 3 hours, the reaction was slowly added to a mixture of water/ethanol (1:1 v/v, 100 mL), the precipitate was washed, filtered and dried at 40° C. in a vacuum oven overnight.

Compound 5 (0.50 g, 2.4 mmol of AGUs) was dissolved in dimethylformamide (5 mL) at 40° C. N,N-diisopropylethylamine (0.05 mL) and octanoyl chloride (0.21 mL, 1.2 mmol) were added and the reaction was stirred for 6 hours. Subsequently, the mixture was slowly added to a solution of water/ethanol (1:1 v/v, 50 mL), filtered, washed and dried at 40° C. in a vacuum oven overnight.
Analytical Methods All materials were characterised using FT-IR spectroscopy in transmission or absorbance mode on an Agilent Technologies Cary 630 FTIR instrument. Where solubility permitted, materials were analysed by 1H-NMR spectroscopy and $^{13}$C-NMR spectroscopy at room temperature using a Bruker AV-400 instrument.

For batch testing, materials (10 mg) were dispersed in synthetic hard water (250 ppm as $CaCO_3$, 10 mL) that had been spiked with PFAS (400 ppb of PFOA, PFOS, PFHA, PFBS and PFPeA each per 10 mL of water) in triplicate and agitated for 2 hours. Samples of the resulting solutions were taken at the 2 hour time point in addition to a process control and analysed by LC/MS chromatography. The amount of adsorbed PFAS species was quantified using linear fitting relative to the process control standard line, a blank and a water matrix blank were included as negative controls.
Results Materials designed for removal of PFAS species from water were prepared as outlined in Reaction Scheme 1 (see below).

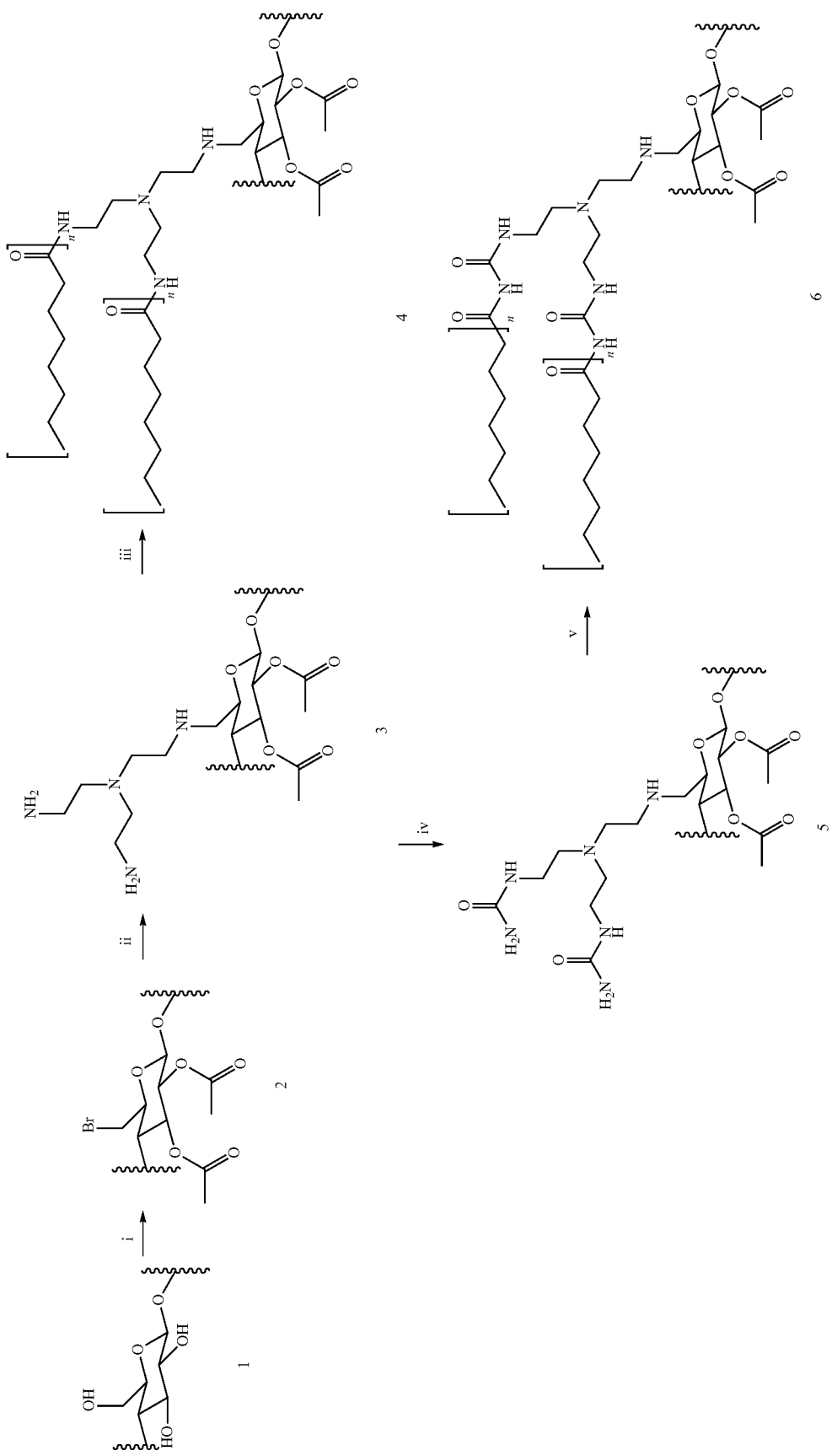
Preparation of functionalised cellulose fibre materials. Reagents: i) a. DMAc, LiBr, b. NBS, PPh3, c. acetic acid, following literature protocol [1], ii) TREN, DMF, iii) and v) octanoyl chloride, DIPEA DMF, n = 0-3 iv) urea, DMF Briefly, cellulose was functionalised using a bromination procedure which is selective for the $C_6$ position. By incorporating the alkyl halide, a leaving group for the subsequent substitution reaction with the amine is formed. The remaining cellulose-based alcohol groups were protected using acetic anhydride, both to prevent side reactions such as crosslinking as well as to improve the solubility of the material for further modifications. Next, compound 2 was reacted with a low molecular weight polyamine core, in this case tris(2-aminoethyl)amine, or 'TREN', to form aminated cellulose (compound 3). After purification and washing procedures, compound 3 was either treated with octanoyl chloride to form compound 4 or reacted with urea to yield compound 5, which was precipitated, washed and also treated with octanoyl chloride to afford compound 6.

The final products were characterised by FT-IR spectroscopy (see FIGS. 1A to 1E). To quantify relative functional group amounts and relate this to performance, the well-known cellulose-based C—O—C signal around 1155 cm-1 (which is present throughout all modifications) was used as a reference. Ratios between the signal of interest and reference signal were used to approximate changes in relative functional group amounts. More specifically, because the spectrum is in transmission mode, ratios of (B−I(vFG))/(B−I(vCOC)) from normalised spectra were assessed, where B is defined as the base value at 4000 cm$^{-1}$ and I is defined as the intensity at a given peak.

Normalised IR spectra shown in FIGS. 1A-E all contain the representative IR signals for TREN, more specifically we focused on the TREN CH-bending vibration around 1385-1365 cm$^{-1}$, as the NH signals may overlap with water. Compounds 4 (TREN octa) and 6 (TREN urea octa) both contain carbonyl signals at 1739 cm-1 indicative of the hydrophobic acyl chain, which are not present in compounds 3 (TREN) or 5 (TREN urea).

Figure 2A:
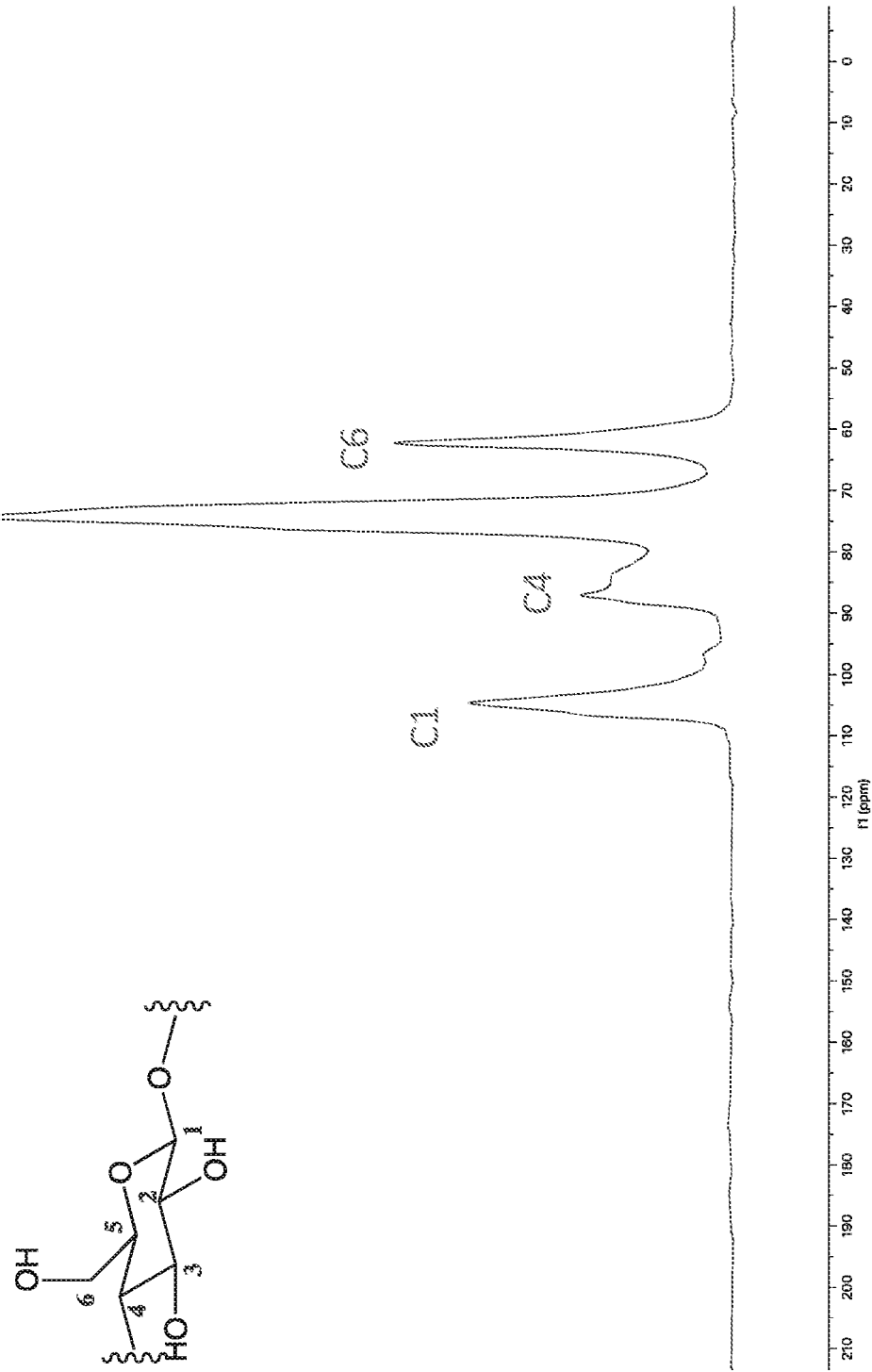
FIGS. 2A and 2B respectively show the solid-state Cross-Polarization Magic Angle Spinning Carbon-13 Nuclear Magnetic Resonance (CP/MAS 13C-NMR) spectra of unfunctionalised cellulose, and of functionalized cellulose, compound 4 (TREN octa). The molecular structure and carbon assignments of the relevant compounds are inset.
Figure 2B:
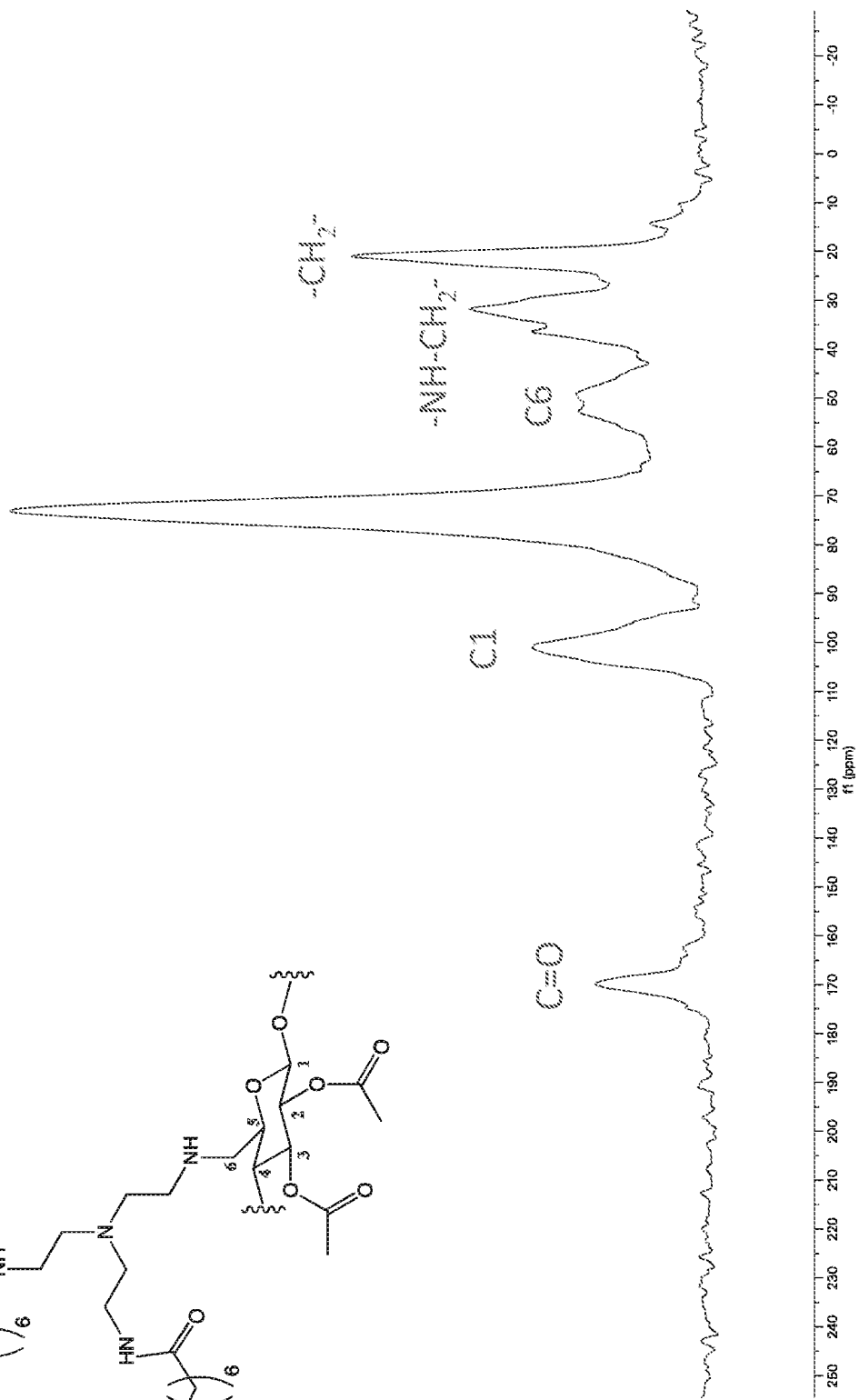

Further characterisation data, specifically CP/MAS 13C-NMR spectra of unfunctionalised cellulose, and of functionalised cellulose, compound 4 (TREN octa), are shown in FIGS. 2A and 2B. The spectrum of unfunctionalised cellulose shows the typical structure of the cellulose backbone. Once functionalised, some shifts within the cellulose backbone structure become apparent. In addition, the signal at 170 ppm was assigned to C═O carbons from both the acetyl groups and amide bonds. The broad signal at 21 ppm was assigned to alkyl carbons from the hydrophobic chains. The region between 26 and 41 ppm is associated with hydrocarbons chains and carbons adjacent to amines.

Figure 3:
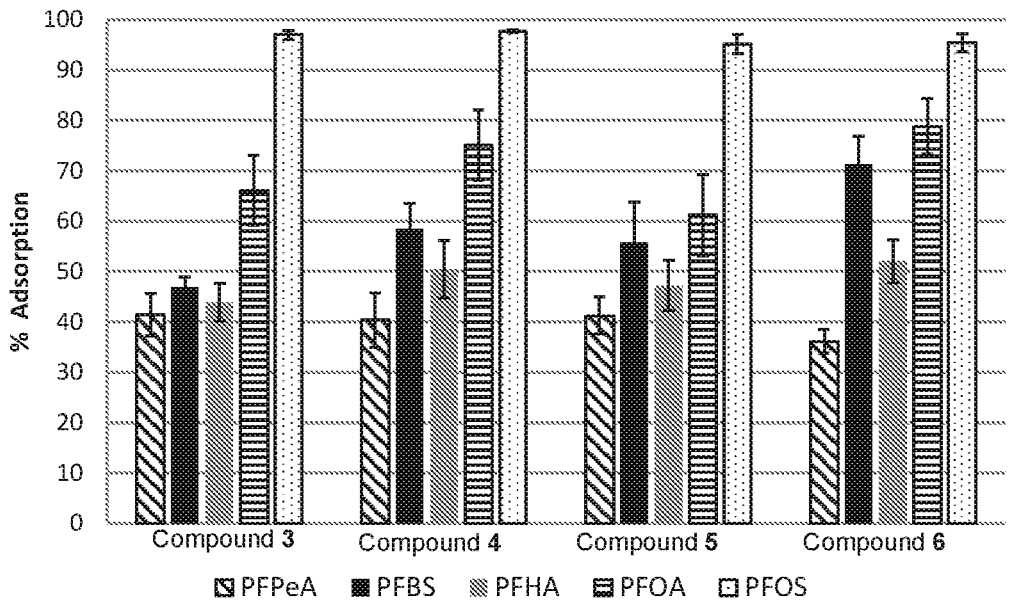
FIG. 3 shows graphs of PFAS adsorption data of sorbent materials mentioned in FIG. 1 assessed in batch test using liquid chromatography-mass spectrometry (LCMS) methodology. Data represented are from one run with triplicate samples in hard synthetic water conditions (250 ppm as $CaCO_3$), error bars represent standard deviation.
Figure 4:
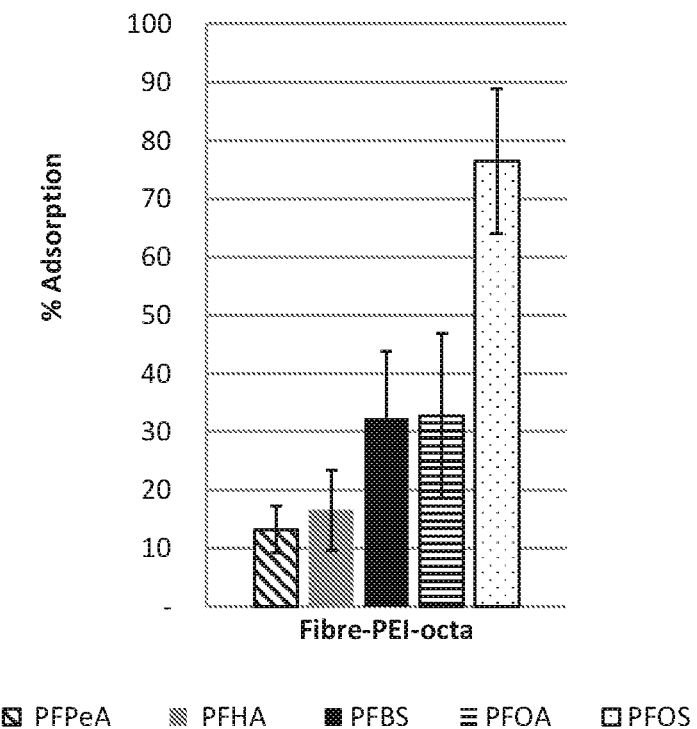
FIG. 4 shows a graph of PFAS adsorption data of a comparative fibre sorbent material coated with 25 kDa PEI and then reacted with octanoyl chloride, assessed in batch test using LCMS methodology. Data represented from one run with triplicate samples in hard synthetic water conditions (250 ppm as $CaCO_3$), error bars represent standard deviation.

To evaluate the ability of the sorbent materials to adsorb PFAS in hard water conditions (as 250 ppm $CaCO_3$), each compound was subjected to a batch test in triplicate. Results are shown in FIG. 3. For comparison, FIG. 4 shows the adsorption performance results of the same base fibres treated with sorbent molecule with a larger polyamine core of 25 kDa PEI amine and octanoyl chloride.

The data illustrate the improved range of adsorption performance achieved by the presently described methods and sorbent compositions. Surprisingly, particularly improved adsorption performance was seen for short-chain PFAS. In addition, changes in performance between compounds 3, 4, 5 and 6 seem to be more subtle than expected and mainly notable in the short-chain species.

Example 2—Regeneration

To evaluate the ability of the sorbent materials to be regenerated, cellulose fibres were prepared and functionalised to prepare compound 4 (TREN octa) as described in Example 1 above.

Figure 5A:
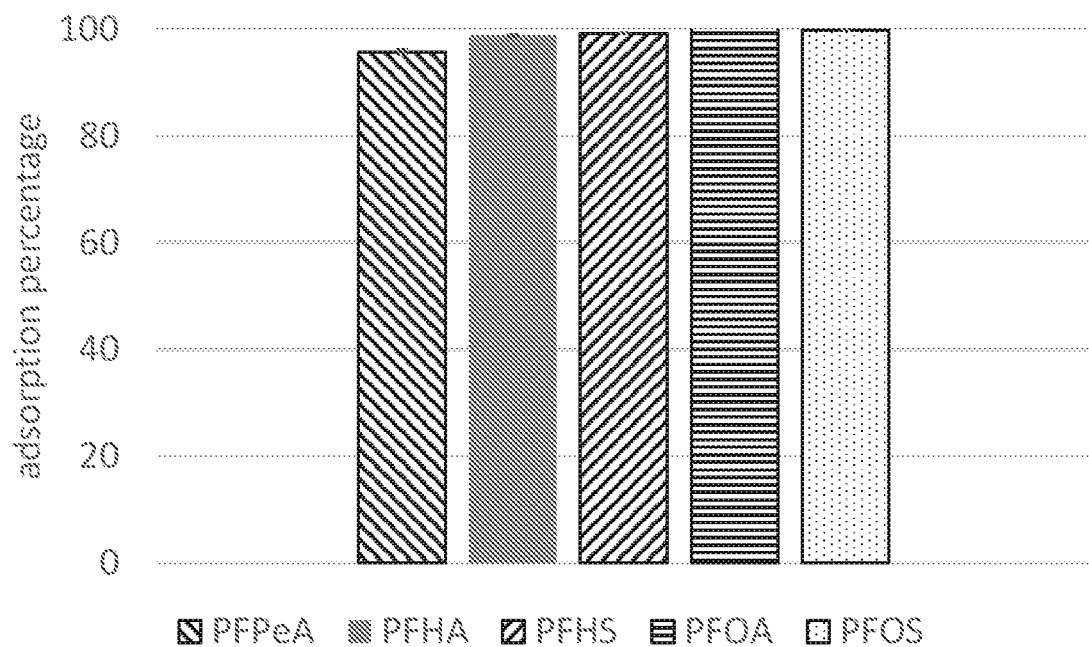
FIG. 5A shows PFAS adsorption data of compound 4 assessed using LCMS methodology.

FIG. 5A shows PFAS adsorption data of compound 4 assessed in batch test (10 mg compound 4, 10 mL de-ionised water and 4 ppm PFPeA, PFHA, PFHS, PFOA, PFOS respectively) using LCMS methodology. The material was subjected to a test as described in Example 1 above, aside from the use of de-ionised water and PFHS. Data represented are from one run of adsorption performance evaluation, with triplicate samples. Error bars represent standard deviation.

Figure 5B:
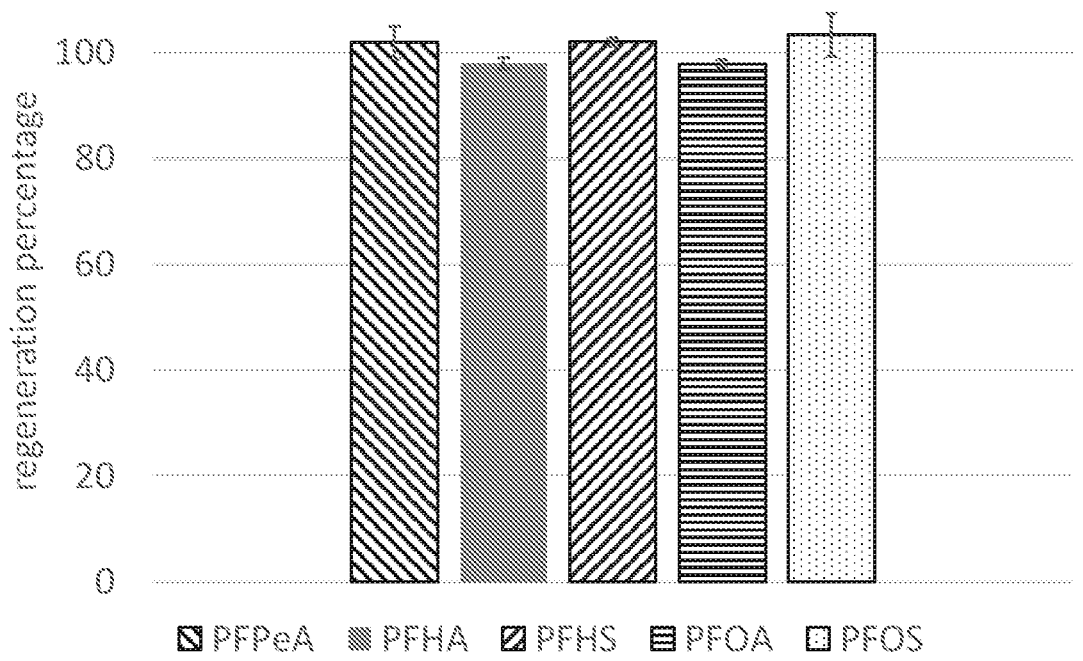
FIG. 5B shows a representation of adsorbed PFAS found in the regeneration fluid following a regeneration step after the adsorption process shown in FIG. 5A.

Materials were separated from batch test fluid and immersed in a regeneration solution of 70% ethanol, 1% ammonium chloride, and balance (30%) of saturated sodium bicarbonate solution and shaken. FIG. 5B shows a representation of the amounts of regeneration of the sorbent material achieved, being the amount of originally adsorbed PFAS by the material that is found in the regeneration fluid after 24 hours (with values apparently over 100% likely due to experimental error). These data indicate that approximately full regeneration can be achieved for a range of different PFAS with compositions and methods according to the present invention, allowing for high levels of recovery of the adsorbed chemicals and/or effective reuse of the prepared sorbent materials.

Although particular embodiments of the invention have been disclosed herein in detail, this has been done by way of example and for the purposes of illustration only. The aforementioned embodiments are not intended to be limiting with respect to the scope of the appended claims, which follow. It is contemplated by the inventors that various substitutions, alterations, and modifications may be made to the invention without departing from the spirit and scope of the invention as defined by the claims.

The invention claimed is:

1. A composition for removal of a target substance from a fluid stream, the composition comprising:
    a support material comprising cellulose; and
    a sorbent molecule that comprises a linear or branched polyamine having a molecular weight of less than 500 Daltons;
    wherein the polyamine is covalently linked to the support material; and
    wherein the sorbent molecule further comprises a covalently linked hydrophobic group.

2. The composition of claim 1, wherein the support material is comprised of a material selected from one or more of the group consisting of: regenerated cellulose; lignocellulose; bacterial cellulose; cellulose pulp; microcrystalline or nanocrystalline cellulose; cellulose fibres; fibrillated cellulose and other cellulose derivatives.

3. The composition of claim 2, wherein the support material comprises a cellulose or lignocellulose powder or pulp.

4. The composition of claim 3, wherein the cellulose or lignocellulose powder or pulp is incorporated into a membrane or membrane-like filter.

5. The composition of claim 1, wherein the support material comprises acetylated cellulose.

6. The composition of claim 1, wherein the support material is porous, solid, and particulate, suitably wherein the average diameter size of the particles is greater than about 0.01 mm, and less than about 1 mm.

7. The composition of claim 1, wherein the polyamine is selected from a linear or branched alkyl polyamine having a molecular weight of less than 300 Daltons.

8. The composition of claim 7, wherein the polyamine is selected from a compound of Formula I,

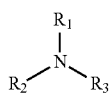
(I)

where R₁ and R₂ are selected from H, —CH₃ or a linear or branched $C_2$-$C_6$ alkyl mono- or di-amine, and wherein R₁ and R₂ are not both H or —CH₃;

where R₃ is selected from:

a linear or branched $C_2$-$C_6$ alkyl mono- or di-amine;

a linear dialkylamine of formula II:

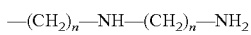
(II)

where n may be any integer of between 2 and 6;

a linear alkylamine of formula III

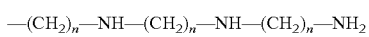
(III)

where n may be any integer of between 2 and 6; and a branched dialkylamine of formula IV:

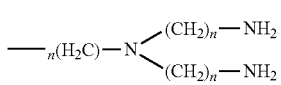
(IV)

where n may be any integer of between 2 and 6.

9. The composition of claim 8, wherein the polyamine is selected from one or more of the following compounds:

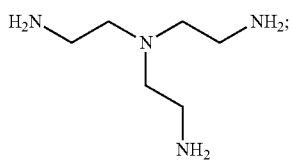
(i)

Tris(2-aminoethyl)amine TREN

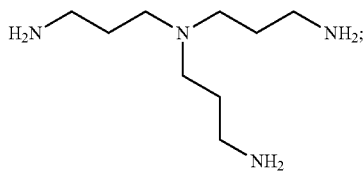
(ii)

Tris (3-aminopropyl)amine

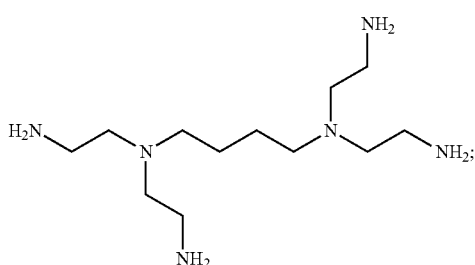
(iii)

N,N,N′,N′-tetrakis(2-aminoethyl)butane-1,4-diamine

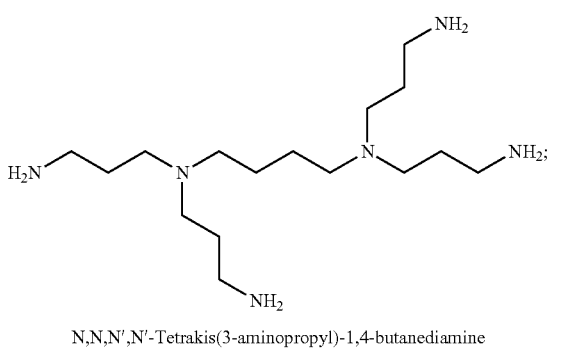
(iv)

N,N,N′,N′-Tetrakis(3-aminopropyl)-1,4-butanediamine

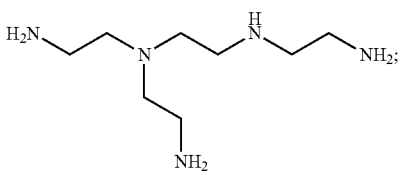
(v)

Tris(2-aminoethyl)-N,N,N′-ethyldiamine

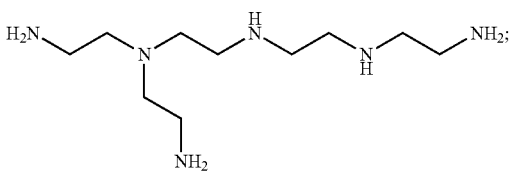
(vi)

1,11-diamino-3(2-aminoethyl)6,9-triazaundecane

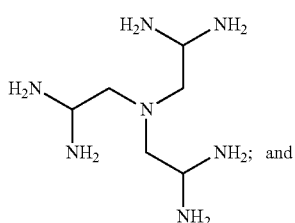
(vii)

2-N,2-N-bis(2,2-diaminoethyl)ethane-1,1,2-triamine

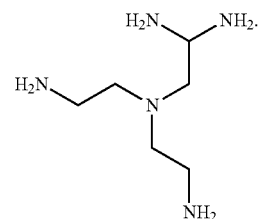
(viii)

2-N,2-N-bis(2-aminoethyl)ethane-1,1,2-triamine

10. The composition of claim 8, wherein the polyamine is selected from one or more of the following compounds:

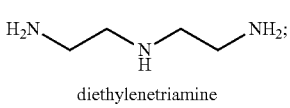
(a)

diethylenetriamine

-continued

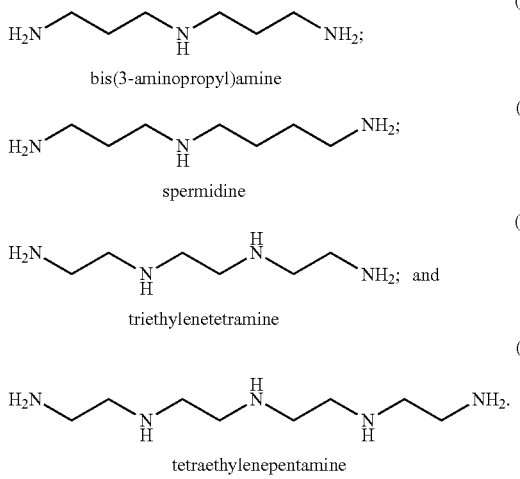

11. The composition of claim 7, wherein the polyamine is selected from a linear or branched alkyl polyamine having a molecular weight of less than 200 Daltons.

12. The composition of claim 1, wherein the hydrophobic group comprises a group selected from: a $C_2$-$C_{22}$ branched, linear, saturated or unsaturated, or cyclic alkyl; a polyether; and an aryl.

13. The composition of claim 12, wherein the $C_2$-$C_{22}$ alkyl group is selected from the group consisting of a: butyl; hexyl; octyl; isobutyl; isohexyl; isooctyl; cyclohexyl; cycloheptyl; and cyclooctyl.

14. The composition of claim 1, wherein the sorbent molecule comprises a plurality of hydrophobic groups.

15. The composition of claim 1, wherein the polyamine is linked to the hydrophobic group via a bond selected from the group consisting of: an amide bond; a urea linkage; a thiourea linkage; an isothiouronium linkage; a guanidinium linkage and a quaternisation (Menshutkin) reaction.

16. A process for removal of a target substance from a fluid stream comprising contacting the fluid stream with a composition as defined in claim 1, and wherein the target substance comprises one or more poly- and perfluorinated alkyl substance (PFAS).

17. The process of claim 16, wherein the fluid stream comprises water.

18. The process of claim 17, wherein the fluid stream comprises contaminated water.

19. The process of claim 16, wherein the PFAS is selected from a perfluorinated anionic surfactant compound, including one or more selected from the group consisting of: perfluorobutane sulfonate (PFBS); perfluorobutanoic acid (PFBA); perfluoropentanoic acid (PFPeA); perfluorohexanesulfonate (PFHS); perfluorohexanoic acid (PFHA); perfluorooctanoic acid (PFOA); perfluorooctane sulfonate (PFOS); perfluorononanoic acid (PFNA); and perfluorodecanoic acid (PFDA); 6:2 fluorotelomer sulfonic acid (6:2 FTSA); and hexafluoropropylene oxide dimer acid (HFPO-DA).

20. The process of claim 16, wherein the process further comprises regenerating the composition after the removal of the target substance from the fluid stream.

21. The process of claim 20, wherein regenerating the composition comprises applying one or more liquid washes to the composition, wherein the liquid wash comprises one or more of the group consisting of an aqueous salt solution; a basic wash; and a polar organic solvent.

22. The process of claim 21, the base for the basic wash is selected from ammonium hydroxide, sodium hydroxide, sodium bicarbonate and potassium hydroxide and the polar organic solvent is selected from an alcohol or a ketone.

23. A filter for the adsorption of a target substance from a contaminated water source, wherein the filter comprises a composition as described in claim 1, and wherein the target substance comprises one or more PFAS.

* * * * *